Dec. 6, 1927.  
C. LE G. FORTESCUE  
1,651,519
TRANSMISSION SYSTEM
Filed July 31, 1924
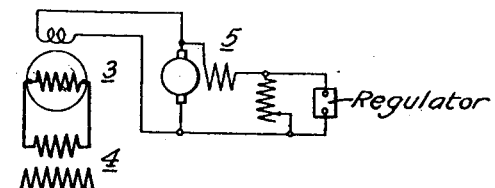
Fig. 1.
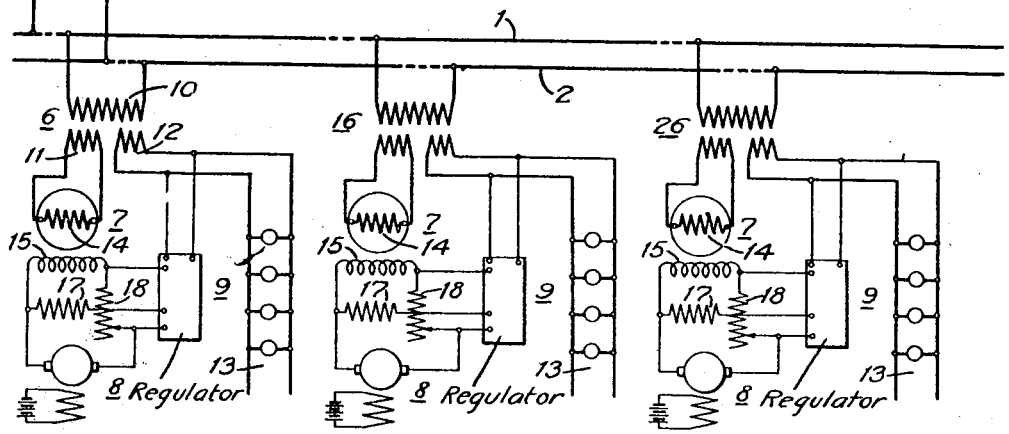
Fig. 2.
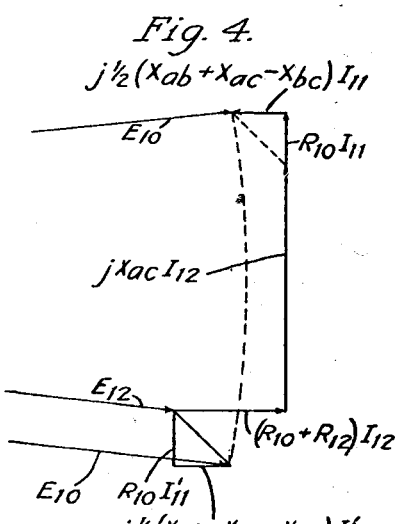
Fig. 4.
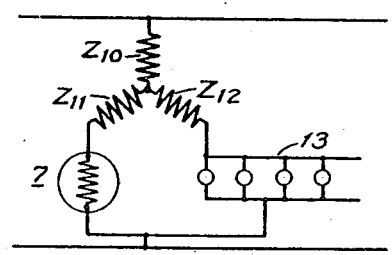
Fig. 3.
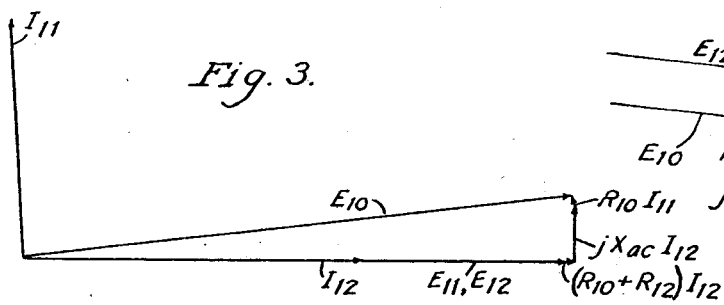
WITNESSES:
G. S. Neilson
W. R. Coley
INVENTOR
Charles Le G. Fortescue
BY
Wesley G. Carr
ATTORNEY Patented Dec. 6, 1927.

1,651,519

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

TRANSMISSION SYSTEM.

Application filed July 31, 1924. Serial No. 729,245.

My invention relates to electrical power transmission lines or systems and regulating apparatus therefor, and particularly to systems for the transmission of power at high voltages over long distances.

In a copending application of Frank G. Baum, Serial No. 569,704, filed June 20, 1922, patented February 8, 1927, No. 1,617,007, is shown a system that is particularly adapted to the high-voltage, long-distance transmission of electrical power, this system embodying a plurality of synchronous condensers spaced along the line at remote intervals and adapted to provide the wattless current required in each section of the line between condenser stations, whereby a substantially constant voltage may be maintained throughout a relatively long transmission line.

One object of my invention is to provide, in conjunction with a system of the above-indicated character, means for maintaining a substantially constant voltage upon load circuits at the respective condenser stations, while inherently holding the main transmission line voltage to a practically constant value, or one that slightly rises with increasing load.

More specifically stated, it is an object of my invention to provide, in conjunction with a transmission line and a three-winding transformer that is energized therefrom, a synchronous condenser that is connected to one of the secondary windings, together with a regulator that is adapted to adjust the field excitation of the synchronous condenser in accordance with the voltage across the other secondary transformer winding, to which the load circuit is connected.

Other objects of my invention will become evident from the following detailed description taken in conjunction with the accompanying drawing, wherein Figure 1 is a diagrammatic view of a transmission and distribution system organized in accordance with my present invention;

Fig. 2 is an "equivalent branch circuit" impedance diagram serving to illustrate the relative impedance values introduced into certain parts of the system illustrated in Fig. 1 by the circuits of the transformer; and Fig. 3 and Fig. 4 are vector diagrams illustrating certain relations of various electrical quantities that are present during the operation of the illustrated system.

Referring to Fig. 1, the system here shown comprises a transmission line embodying conductors 1 and 2, to which one or more generators 3 are connected through suitable step-up transformers 4, the generators being regulated for constant voltage by means of an exciter 5 and a suitable regulator as illustrated.

It will be appreciated that, in actual practice, the transmission system will be of the three-phase type although, for the sake of simplicity, a single-phase system has been illustrated.

At intervals along the transmission line, a plurality of condenser substations, such as 6, 16 and 26, are provided for the purpose of maintaining a substantially constant voltage upon the transmission line and effecting the transmission of relatively large blocks of power over the line, as more fully set forth in the above-identified application of Frank G. Baum.

Each condenser station comprises a synchronous condenser 7, an exciter 8 therefor, a broad-range regulator 9, and a suitable step-down transformer having a primary winding 10 and a plurality of secondary windings 11 and 12, the winding 11 being connected to the primary or stator winding 14 of the synchronous condenser 7, while the winding 12 is connected to a load circuit 13.

The exciter 8, which may be of any suitable character, is adapted to energize the field winding 15 of the synchronous condenser, while a plurality of resistors 17 and 18 are provided in conjunction with the broad-range regulator 9 to automatically adjust the field excitation of the condenser. The main voltage coil of the regulator 9 is connected across the secondary transformer winding 12, as indicated; that is to say, across the load circuit 13, whereby the synchronous condenser field excitation is regulated in accordance with the voltage of the transformer winding 12, or in other words, a substantially constant voltage is maintained upon the load circuit 13 by means of the illustrated interconnections of the regulator 9 with the synchronous condenser field winding 15 and the load circuit 13.

Inasmuch as the particular type of regulator to be employed is not relevant to the present invention, since any suitable regulator for automatically over-exciting and under-exciting the field winding 15, as desired, may be employed, I have not deemed it necessary to illustrate the details of such a regulator. As examples thereof, reference may be had to Tirrill Patent No. 1,192,708, which was granted July 25, 1916 and to a copending application of H. A. Travers, regulator systems, Serial No. 540,178, filed March 1, 1922 and assigned to the Westinghouse Electric & Manufacturing Company.

By means of the illustrated system, a substantially constant voltage is maintained upon the load circuit where a steady voltage is very desirable, particularly in the case of lighting loads, while a practically constant voltage or one slightly rising with increasing load may be maintained upon the transmission line 1, 2, as more fully hereinafter explained.

Referring to Fig. 2, the impedances $Z_{10}$, $Z_{11}$ and $Z_{12}$, which respectively correspond to the step-down transformer windings 10, 11 and 12 should be so chosen, following well-known principles of transformer design, that the effect of the load currents produced by the synchronous condenser 7 in the winding 11 will substantially annul the voltage rise caused by the resistance load, or other load operating at any power-factor other than unity, on the secondary transformer winding 12. This relation of impedances of the various portions of the circuit will afford the best conditions for achieving the objects of the present invention.

A vectorial discussion of the circuit conditions is given below with reference to Fig. 3 and Fig. 4 of the drawing. In this discussion, the various quantities, such as voltages, currents and resistances, are considered on the basis of a 1 to 1 ratio of transformation, for the sake of simplicity.

Let $X_{ab}$ represent the total leakage reactance between the primary winding 10 and the secondary winding 11;

$X_{ac}$ represent the total leakage reactance between the primary winding 10 and the other secondary winding 12; and $X_{bc}$ represent the total leakage reactance between the secondary winding 11 and the other secondary winding 12.

Consider first the special case corresponding to the above discussion of Fig. 2, wherein $X_{ab} + X_{ac} - X_{bc} = 0$. It may be shown that $\frac{1}{2}(X_{ab} + X_{ac} - X_{bc})$ is equal to the effective impedance $Z_{10}$ of the equivalent diagram of Fig. 2, (neglecting the relatively small resistances of the transformer windings). Thus, if $Z_{10}$ is substantially zero, the voltage at the terminal of $Z_{11}$ is not affected by any load that may be drawn from $Z_{12}$, and vice versa.

As illustrated in Fig. 3, $E_{11}$ and $E_{12}$ correspond to the voltages of the secondary windings 11 and 12, respectively, and will be substantially in phase. Consequently, for a unity-power-factor load 13 on the winding 12, the corresponding currents $I_{11}$ and $I_{12}$ will be substantially in quadrature. The resistances of the windings 10, 11 and 12, respectively, are represented by the characters $R_{10}$, $R_{11}$ and $R_{12}$. It will thus be noted that the voltage drop $(R_{10} I_{11})$ is substantially in quadrature with the voltage $E_{12}$ of the secondary winding 12. Since this secondary winding is regulated for constant voltage, it follows that $E_{10}$, the terminal voltage of the primary winding 10, will rise slightly with load. However, this rise will be on the order of about one per cent and thus, by regulating for constant voltage on the load circuit (13 in Fig. 1), the primary voltage, that is the voltage of the transmission line proper, is held at a practically constant or slightly rising value by the inherent action of the three-winding transformer and the illustrated regulating system therefor.

Moreover, if desired, the variation of the primary or line voltage from the normal may be decreased still further by an appropriate selection of the value of $(X_{ab} + X_{ac} - X_{bc})$ slightly different from the zero value assumed above. The diagram of Fig. 4 shows the impedance drops when this value is relatively small and the current $I_{11}$ leads the current $I_{12}$.

As will be noted from the diagram, at full load a transformer connected to the end of the transmission line would take a leading current corresponding to the value of $I_{11}$ and a load current corresponding to the value of $I_{12}$. Under the conditions assumed, the primary or line voltage would be $E_{10}$. Under no-load conditions, when $I_{12}$ equals zero, the transmission line requires a lagging current such as $I'_{11}$. In this event, the primary voltage may be represented by $E'_{10}$.

Consequently, by an appropriate choice of the inductance values $X_{ab}$, etc., the scalar values of the voltages $E_{10}$ and $E'_{10}$ at full load and at no load, respectively, could be made substantially equal.

For intermediate values of load, the primary voltage would vary an insignificant amount from the values at no load and full load. Under the conditions last assumed, therefore, the voltage on the load circuit is maintained constant and, at the same time, the primary or line voltage is also maintained practically without variation.

It will be understood that the transformer 6 should be designed and proportioned with due regard to the power-factor of the load to be carried. Where this power-factor fluctuates to any extent, there will be a tendency towards fluctuation in the primary voltage. However, the primary voltage may be maintained substantially independent of such fluctuations by proper design of the transformer itself I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of transmission, the combination with a transmission line, of a plural-secondary-winding transformer energized therefrom, a load circuit and a dynamo-electric machine connected to different windings of said transformer, and means for regulating the excitation of said machine in accordance with the voltage of said load circuit.

2. In a system of transmission, the combination with a transmission line, of a plural-winding transformer energized therefrom, a load circuit and a dynamo-electric machine connected to different secondary windings of said transformer, and means for regulating the excitation of said machine in accordance with the voltage of said load circuit.

3. In a system of transmission, the combination with a transmission line, of a plural-secondary-winding transformer energized therefrom, a load circuit and a dynamo-electric machine connected to different windings of said transformer, and means for maintaining a substantially constant line voltage, said means comprising a regulator controlled in accordance with the voltage of said load circuit for adjusting the excitation of said machine.

4. In a system of transmission, the combination with a transmission line, of a plural-winding transformer energized therefrom, a load circuit and a dynamo-electric machine connected to different secondary windings of said transformer, and means for maintaining a substantially constant line voltage, said means comprising a regulator controlled in accordance with the voltage of said load circuit for adjusting the excitation of said machine.

5. In a system of transmission, the combination with a transmission line, of a plural-winding transformer energized therefrom, a dynamo-electric machine connected to a secondary winding of said transformer, and means for regulating the excitation of said machine in accordance with the voltage of another secondary winding of the transformer.

6. In a system of transmission, the combination with a transmission line, of a plural-secondary-winding transformer energized therefrom, a dynamo-electric machine connected to one winding of said transformer, and means for maintaining a substantially constant line voltage, said means comprising a regulator controlled in accordance with the voltage of another winding of the transformer for adjusting the excitation of said machine.

7. In a system of transmission, the combination with a transmission line, of a plural-winding transformer energized therefrom, a dynamo-electric machine connected to a secondary winding of said transformer, and means for maintaining a substantially constant line voltage, said means comprising a regulator controlled in accordance with the voltage of another secondary winding of the transformer for adjusting the excitation of said machine.

8. In a system of transmission, the combination with a transmission line, of a plural-winding transformer energized therefrom, a load circuit and a synchronous condenser connected to different secondary windings of said transformer, and means for regulating the field-winding current of said synchronous condenser in accordance with the voltage of said load circuit.

9. In a system of transmission, the combination with a transmission line, of a plural-secondary-winding transformer energized therefrom, a load circuit and a synchronous condenser connected to different windings of said transformer, and means for maintaining a substantially constant line voltage, said means comprising a regulator controlled in accordance with the voltage of said load circuit for adjusting the field winding current of said synchronous condenser.

10. In a system of transmission, the combination with a transmission line, of a plural-winding transformer energized therefrom, a load circuit and a synchronous condenser connected to different secondary windings of said transformer, and means for maintaining a substantially constant line voltage, said means comprising a regulator controlled in accordance with the voltage of said load circuit for adjusting the field winding current of said synchronous condenser.

11. A transmission system comprising a source of power, a synchronous condenser, a load, a transformer having three windings, the primary winding being connected to said source, another winding to said condenser and the third to said load, a regulator energized in accordance with the load voltage for governing the excitation of said condenser and maintaining a substantially constant load voltage, said transformer being further adapted to maintain substantially constant voltage across its primary winding.

12. The combination with a three-winding transformer, of a load circuit connected to one winding, a device drawing variable reactive current-components connected to a second winding, and means responsive to the voltage of said load circuit for controlling said reactive current-components in the second winding, whereby desired voltage conditions may be maintained on said load circuit, the effective reactance impedance between the said first and second windings being approximately equal to the sum of the effective reactance impedance between the third winding and said first winding plus the effective reactance impedance between the said third winding and the said second winding, whereby the voltages at the terminals of the said first and second windings are substantially in phase and independent of the load conditions of the respective windings.

13. The combination with a three-winding transformer, of a load circuit connected to one winding, a variable reactance device connected to a second winding, and means responsive to the voltage of said load circuit for controlling said reactive current-components in the second winding, whereby desired voltage conditions may be maintained on said load circuit, the effective reactance impedance between the said first and second windings being very nearly, but not quite, equal to the sum of the effective reactance impedance between the third winding and said first winding plus the effective reactance impedance between the said third winding and the said second winding, whereby the voltages at the terminals of the said first and second windings are substantially in phase and independent of the load conditions of the respective windings, and whereby the voltage on the third winding, when a representative load is drawn from the first winding, is substantially equal to the voltage on the third winding during zero load conditions.

In testimony whereof, I have hereunto subscribed my name this 25th day of July, 1924.

CHARLES LE G. FORTESCUE.